United States Patent [19]
Fukuichi et al.

[11] Patent Number: 4,489,437
[45] Date of Patent: Dec. 18, 1984

[54] SPEECH SYNTHESIZER

[75] Inventors: Takuro Fukuichi; Yasuo Kusumoto; Sumio Fujita; Shuji Kawamura, all of Tokyo, Japan

[73] Assignee: Seiko Instruments & Electronics Ltd., Tokyo, Japan

[21] Appl. No.: 343,198

[22] Filed: Jan. 27, 1982

[30] Foreign Application Priority Data

Jan. 29, 1981 [JP] Japan ................................. 56-11871

[51] Int. Cl.³ ............................................. G10L 1/00
[52] U.S. Cl. ..................................................... 381/51
[58] Field of Search ................................... 381/29–54; 364/513.5

[56] References Cited

U.S. PATENT DOCUMENTS 4,270,027  5/1981  Agrawal et al. ...................... 381/31
4,335,275  6/1982  Brantingham ........................ 381/51

OTHER PUBLICATIONS

Cole, et al., "A Real Time Floating Point ... Vocoder", IEEE Conf. Record, Acoustics, Speech ..., 1977, pp. 429, 430.

Primary Examiner—E. S. Matt Kemeny
Attorney, Agent, or Firm—Robert E. Burns; Emmanuel J. Lobato; Bruce L. Adams

[57] ABSTRACT

A speech synthesizer, using linear predictive coding technique, obtains variable frame lengths by multiplying a pitch period by the number of repetitions, and interpolates PARCOR coefficients at a rate different than the interpolation of amplitude.

4 Claims, 1 Drawing Figure

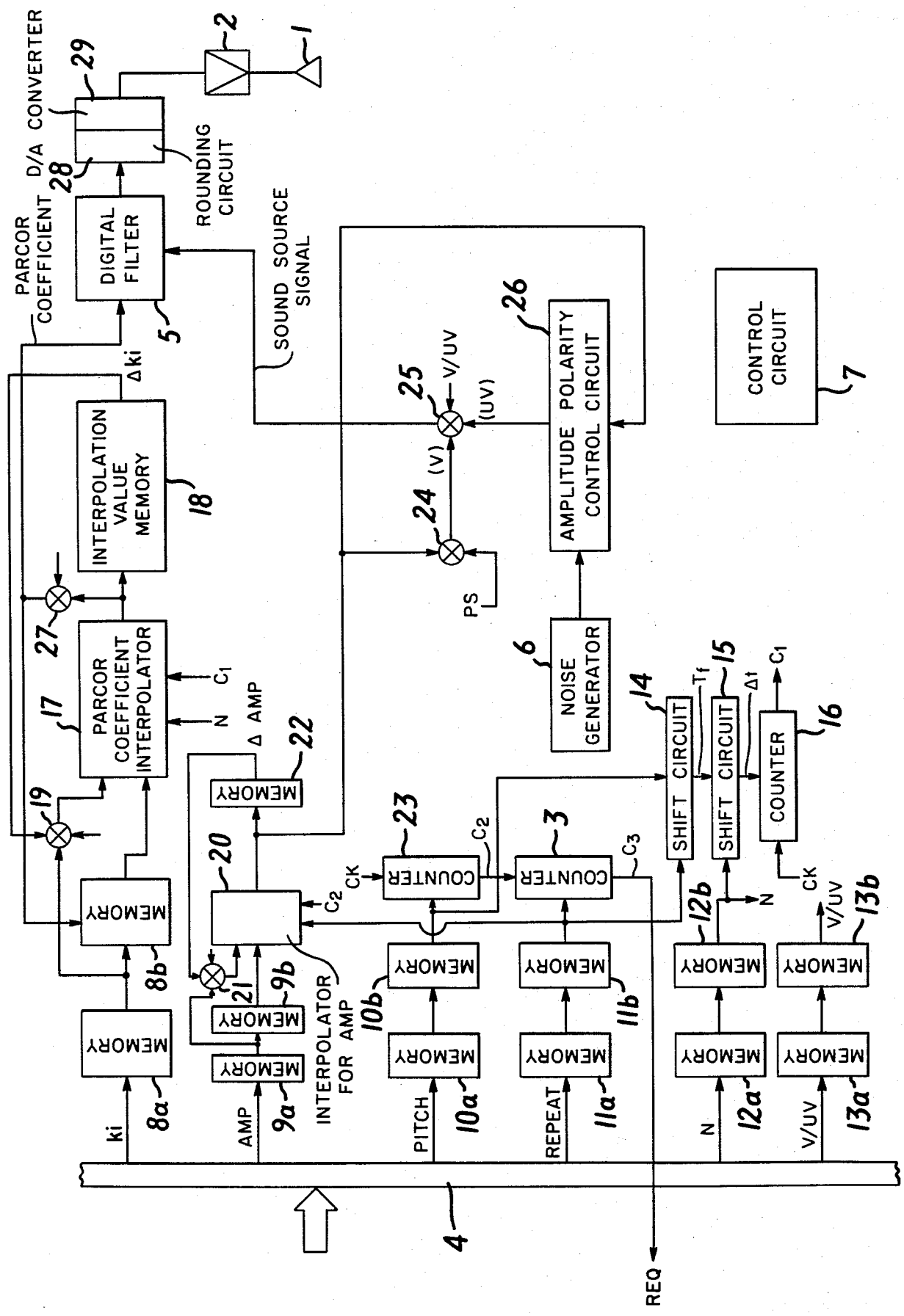

SPEECH SYNTHESIZER

BACKGROUND OF THE INVENTION

This invention relates to a speech synthesizer for using Speech Analysis and Synthesis of linear predictive coding techniques representing the PARCOR (PARTIAL AUTOCORRELATION) technique.

A recent speech synthesizer uses a fixed frame length, namely a fixed renew frequency of speech parameter at the synthesizing time and is intended to decrease information required at the synthesizing time so that the speech synthesizer is realized in one chip LSI.

The interpolation process which makes speech parameter in the frame change is executed so as to smooth the change of speech parameter in dependence on the time. It is required that the frame period is short so as to smooth the change of speech parameter in dependence on time in order to obtain good sound quality.

In this aspect, the conventional speech synthesizer does not attain sufficiently synthesized speech. There is a variable frame length technique as the approach of the speech synthesizer of PARCOR technique. In the variable frame length, one pitch of voiced sound including at least one pitch is a fundamental time and the frame interval is changed in dependence on the change of pitch length.

It is advantageous that the variable frame length may obtain better synthesized speech sound, but it is the problem that it makes information required in speech synthesis increase.

SUMMARY OF THE INVENTION

It is an object of this invention to provide a speech synthesizer for using linear predictive coding technique represented by PARCOR technique and for using Speech Analysis and Synthesis of the variable frame length in which the speech synthesis of speech having the repetitive waveforms executes with the repeat process to decrease information required in the speech synthesis and executes with the interpolation process of speech parameter in the variable frame length and the repeat process to obtain good synthesized speech quality.

It is another object of this invention to provide a speech synthesizer for using linear predictive coding technique and for using variable frame length technique in which one pitch of an original speech is a fundamental time, the number of repetitions of substantially the same waveform of said original speech is repeat times and a length of one frame is (one pitch) X (repeat times), comprising:

a circuit for determining a frame interval from pitch data and repeat time in speech data, a circuit for determining an interpolation period corresponding to the determined frame interval and for generating an interpolation timing signal every interpolation period, a circuit for determining an interpolation value per one interpolation from the interpolation period and speech parameters of two adjacent frames, and a circuit for executing an interpolation of the speech parameters in order by using the interpolation value in synchronism with the interpolation timing signal.

BRIEF DESCRIPTION OF THE DRAWING

FIGURE is a block diagram showing an embodiment of the speech synthesizer according to this invention.

PREFERRED EMBODIMENT OF THE INVENTION

Referring now to the drawing showing an embodiment of this invention, the FIGURE shows a block diagram of a speech synthesizer according to this invention. The circuit except the speaker 1, the driving circuit 2 and etc. is constructed within LSI (Large Scale Integrated Circuit).

As known already, the analysis speech data stored in the speech ROM are provided to the speech synthesizer in order with the predetermined prosecution by the control of a microprocessor not shown in the FIGURE.

The speech data corresponding to one-frame described below is provided to the bus line 4 from the microprocessor side in response to the data request signal REQ generated from the counter 3 in the speech synthesizer as described hereinafter.

TABLE 1

| PARCAR coefficient $K_i (K_1, K_2, \ldots, K_{10})$ | |
| --- | --- |
| Discriminating signal of voiced sound/unvoiced sound | V/UV |
| Amplitude data | AMP |
| Pitch data | PITCH |
| Repeat times | REPEAT |
| Classification signal of interpolation period | N |

As known already, the PARCOR coefficient $K_i$ is the parameter for determining the transmission characteristic of the digital filter 5, and the amplitude data AMP, the pitch data PITCH and the repeat times REPEAT are data for determining the amplitude, the period and the pulse number of the pulse signal serving as the a speech source signal inputted to the digital filter 5.

Now, when the repeat times REPEAT is 1, the speech synthesizer becomes the complete variable frame length as the synthesized pitch frequency is equal to the frame frequency.

However, according to this invention, the speech synthesis of the voiced sound having repetitive waveforms does not allot one pitch to one frame but one pitch x repeat times REPEAT to one frame.

As a result of it, it is possible for the speech synthesizer of this invention to decrease information required in the speech synthesis very much. In the speech synthesis of the unvoiced sound, the random noise (pulse signal being random in polarity) from the noise generator 6 is encoded digitally and is inputted as the speech source signal to the digital filter 5.

At the time, the amplitude of the noise is determined by the amplitude data AMP and the time of noise application is determined by the pitch data PITCH and the repeat times REPEAT.

As for the unvoiced sound, the frame (analysis-window) at the time of the analysis is constant so that the pitch data PITCH is constant.

As a result of it, the frame frequency at the synthesis is determined substantially by the repeat times REPEAT. As described above, the synthesis process of the speech data corresponding to one-frame provided from the microprocessor is executed with the arithmetic operation at the time $T_f$ represented by $(PITCH) \times (REPEAT) = T_f$.

This time $T_f$ which means the frame interval changes in response to the received speech data. The classification signal N of interpolation period on the speech data table is the signal for determining the interpolation period $\Delta t$ of PARCOR coefficient $K_i$ which equals to the value of the time $T_f$ divided by the classification signal N determined by the frame interval $T_f$.

Namely, $\Delta t = T_f/N$.

The interpolation is executed $(N-1)$ times in the period $\Delta t$ with respect to PARCOR coefficient $K_i$ in the frame interval $T_f$.

Herein, describing with the concrete numeric value with respect to an embodiment, the repeat times REPEAT of this embodiment is determined by the involution of 2 such as 1, 2, 4, 8, ... and the classification signal N of the interpolation period is determined to the involution of 2 such as 4, 8, 16, 32. And the relationship between $T_f$ and N is determined as the following table:

TABLE 2

| $T_f$ | N |
|---|---|
| 10 msec and BELOW | 4 |
| 10–20 msec | 8 |
| 20–40 msec | 16 |
| OVER 40 msec | 32 |

As understood from the above table, the interpolation period $\Delta t = T_f/N$ of $K_i$ is below 2.5 msec so that the interpolation is made effectively.

According to the embodiment, in addition to the interpolation of PARCOR coefficient $K_i$ the interpolation of AMP is executed to change smoothly from the amplitude of the present frame to the amplitude of next frame.

Namely, the amplitude data AMP is not constant during $T_f$ in the case that the repeat times is not 1, namely in the case that the repetitive process is executed. Next, the circuit operation will be described.

When the speech data corresponding to one frame as shown in table 1 is provided to the bus line 4 in order, PARCOR coefficient $K_i$ is stored in the memory 8a, the amplitude data AMP is stored in the memory 9a, the pitch data PITCH is stored in the memory 10a, the repeat times REPEAT is stored in the memory 11a, the classification signal N of interpolation period is stored in the memory 12a, and the discriminating signal of voiced sound/unvoiced sound V/UV is stored in the memory 13a with the control of the control circuit. Then, with the signal from the control circuit 7, the stored data $K_i$ in the memory 8a is transferred to the memory 8b, the stored data AMP is transferred to the memory 9b, the stored data PITCH in the memory 10a is transferred to the memory 10b, the stored data REPEAT in the memory 11a is transferred to the memory 11b, the stored data N is transferred to the memory 12b, and the stored data V/UV is transferred to the memory 13b.

And then, after the signal REQUEST is sent to the microprocessor the speech data of the subsequent frame is sent to the bus line 4.

PARCOR coefficient $K_i$ of the subsequent frame is stored in the memory 8a. AMP of it is stored in the memory 9a, PITCH of it is stored in the memory 10a, REPEAT of it is stored in the memory 11a, the signal N of it is stored in the memory 12a and the signal V/UV of it is stored in the memory 13a.

That is, the speech data DATA 1 of the first frame is stored in the memories 8b–13b and the speech data DATA 2 of the subsequent frame is stored in the memories 8a–13a.

At the time of the synthesis of DATA 1, the interpolation process is executed to smooth the change of $K_i$ and AMP referring to PARCOR coefficient $K_i$ and the amplitude data AMP DATA 1. Where PARCOR coefficient and the amplitude data in the DATA 1 are $K_{i1}$, $AMP_1$, respectively, and the PARCOR coefficient and the amplitude data in the DATA 2 are $K_{i2}$, $AMP_2$.

Now, the process required beforehand in the interpolation of PARCOR coefficient will be described. First, the operation to obtain the above mentioned interpolation period $\Delta t$ will be described.

The pitch data PITCH stored in the memory 10b is preset into the shift circuit 14 serving as the multiplier. The repeat times REPEAT is applied to the shift circuit 14 and serves as the shift signal to shift the content of the shift circuit 14.

As already described, REPEAT is determined to become the value of $2^n = 1,2,4,8,\ldots$ so that the content of the shift circuit 14 is represented by $T_f = (PITCH) \times (REPEAT)$ with shifting by n bits. This data $T_f$ is preset into the shift circuit 15 serving as the divider.

The classification signal (N) of interpolation period stored in the memory 12b is applied to the shift circuit 15 and serves as the shift signal to shift down the content of the shift circuit 15.

As already described, the signal N is determined to become the value of $2^m = 4,8,16,32$ so that the content of the shift circuit 15 is represented by $\Delta t = T_f/N$ with shifting down by m bits.

This interpolation period $\Delta t$ is preset into the presettable down-counter 16.

This counter 16 counts the clock signal CK after initiating the synthesis (the frequency of the clock signal CK is equal to the sampling frequency at the time of the synthesis, for example, 10 KHz) in the down-direction and produces a count-up signal $C_1$ every $\Delta t$.

This signal $C_1$ applies as the interpolation timing signal to the interpolator 17 of PARCOR coefficient.

As the pre-process of the interpolator 17, the interpolation value to execute the addition and subtraction is solved by $K_{i1}$ in the memory 8b and $K_{i2}$ in the interpolation memory 8a and is stored in the interpolation value memory 18. The interpolation value $\Delta K_i$ is represented by $$\Delta K_i = \frac{K_{i2} - K_{i1}}{N}$$

In order to solve $\Delta K_i$, $K_{i1}$ of the memory 8b is taken into the interpolator 17 and $K_{i2}$ of the memory 8a is taken into the interpolator 17 through the change-over gate 19. $(K_{i2} - K_{i1})$ is operated at the interpolator 17 and the result of the arithmetic operation is presetted into the shift circuit of the interpolator 17 (the shift circuit is not shown in the drawings and has the same function as the shift circuit 15 which serves as the divider).

The classification signal N of the interpolation period stored in the memory 12b applies as the shift signal for shifting down to the shift circuit of the interpolator 17 so that $(K_{i2} - K_{i1})/N$ is solved as mentioned above. The value $\Delta K_1$ is stored in the interpolation value memory 18.

It goes without saying that the above mentioned operation is executed at a high speed in 10 kinds of parameters of $i = 1 \sim 10$ in the time sharing manner.

The similar pre-process in the interpolator 20 for the amplitude data AMP is executed.

The interpolation period of AMP is PITCH and the interpolation times is (REPEAT−1).

Accordingly, the interpolation value ΔAMP is represented by the following equation:

$$\Delta AMP = \frac{AMP_2 - AMP_1}{REPEAT}$$

The arithmetic operation to solve this value ΔAMP is substantially the same as that to solve $\Delta K_i$.

$AMP_1$ stored in the memory 9b is taken into the interpolator 20 and $AMP_2$ stored in the memory 9a is taken into the interpolator 20 through the change-over gate 21.

In the interpolator 20, ($AMP_2 - AMP_1$) is operated and is presetted into the shift circuit (omitted in the drawings).

REPEAT stored in the memory 11b applies as the shift signal for shifting down to the shift circuit so that ΔAMP of the former equation is solved and is stored in the interpolation value memory 22.

At the time of initiating the synthesis, PITCH stored in the memory 10b and REPEAT stored in the memory 11b are presetted into the presettable down-counters 23 and 3 respectively.

The counter 23 counts the above mentioned clock CK in the down direction and the count-up signal $C_2$ produces from the counter 23 every PITCH time.

The counter 3 counts the count-up signal $C_2$ in order in the down direction and the count-up signal $C_3$ of the counter 3 is outputted as the data request signal REQ from the counter 3.

The count-up signal $C_2$ of the counter 23 is applied as the interpolation timing signal to the interpolator 20 of AMP.

The preset signal PS of the counter 23 which produces after this count-up signal is applied as the open signal to the gate 24 for sending the voiced sound source signal.

During the operation of the synthesis, when the interpolation timing signal $C_1$ is applied to the interpolator 17 of PARCOR coefficient, $K_{i1}$ stored in the memory 8b is renewed to ($K_{i1} + \Delta K_i$).

Accordingly, PARCOR coefficient provided to the digital filter 5 and the content of the memory 8b changes as $K_{i1} + \Delta K_i \rightarrow K_{i1} + 2\Delta K_i \rightarrow K_{i1} + 3\Delta K_i$ . . . every interpolation timing signal $C_1$.

In the interpolator 20 of AMP too, the interpolation value ΔAMP stored in the interpolation value memory 22 is taken into the interpolator 20 through gate 21 so that AMP is added to $AMP_1$ stored temporarily in the interpolator 20. The operation result ($AMP_1 + \Delta AMP$) is produced from the interpolator 20 and the data stored in the interpolator 20 temporarily changes from $AMP_1$ to ($AMP_1 + \Delta AMP$).

Accordingly, the amplitude data derived from the interpolator 20 changes as $AMP_1 \rightarrow AMP_1 + \Delta AMP \rightarrow AMP_1 + 2\Delta AMP \rightarrow AMP_1 + 3\Delta AMP$ . . . every interpolation timing signal $C_2$.

Discriminating signal of voiced sound/unvoiced sound V/UV stored in the memory 13b is applied as the change-over signal to the change-over gate 25.

While the signal V/UV indicates the voiced sound, the change-over gate 25 is switched to (V) side. In this case, the amplitude data derived from the AMP interpolator 20 is applied as the sound source signal to the digital filter 5 through the gates 24 and 25.

While the signal V/UV indicates the unvoiced sound, the change-over gate 25 is switched to (UV) side. In this case, the amplitude code control circuit 26 produces the random noise coded digitally, changed at random in polarity and controlled by the amplitude data produced from the AMP interpolator 20 under the output signal from the noise generator 6. The random noise is applied as the sound source signal to the digital filter 5 through the gate 25.

In the digital filter 5, the speech waveform is synthesized digitally from the sound source signal and PARCOR coefficient and the digital output of the filter 5 become the speech waveform through the rounding circuit 28 and D/A converter 29 and the driver 2, and an acoustic output produces from the speaker 1.

And as soon as the synthesis process of the speech data DATA 1 corresponding to one frame finishes, the data request signal REQ is produced from the counter 3.

In response to the data request signal REQ, the speech data DATA 2 of the second frame stored in the memories 8a–13a is transferred to the memories 8b–13b and the speech data DATA 3 of the third frame provided to the bus line 4 is stored in the memories 8a–13a.

At this state, the synthesis process of the speech parameter DATA 2 of the second frame is executed with the interpolation referring to and using $K_{i3}$ and $AMP_3$ in the speech data 3 of the third parameter as mentioned above.

According to the above embodiment, the classification signal N corresponding to $T_f$ every frame is provided as the speech data beforehand.

However, the synthesis circuit may be provided with a circuit portion for determining N and Δt based on the output $T_f$ of the shift circuit 14 instead.

As mentioned above, this invention is the speech synthesizer using the speech synthesis technology of the linear predictive coding technique and variable frame length system in which one pitch of the synthesis-sound for analyzing is the fundamental time and the repeat times is the repetitive times of the waveform, and comprising the circuit portion for solving the frame length from pitch data and repeat times, the circuit portion for solving the interpolation value per one interpolation and the circuit for interpolating in order the synthesis parameter from the interpolation timing signal and the interpolation value.

Namely, according to this invention, information required in the synthesis may be reduced greatly from the repetitive process, the interpolation of the synthesis may execute suitably in response to the frame length in spite of the length of the frame and the quality of the synthesis sound is good.

What is claimed is:

1. A speech synthesizer using variable frame lengths obtained by multiplication of a pitch period analyzed from original speech by the number of repetitions of substantially the same waveform as that in said pitch period comprising:

first circuit means for determining a frame interval ($T_f$) from pitch data (PITCH) and repeat times (REPEAT) in speech data, second circuit means for determining a PARCOR coefficient interpolation period (Δt) from the determined frame interval ($T_f$) and for generating a PARCOR coefficient interpolation timing signal ($C_1$) every PARCOR coefficient interpolation in response to an output of said first circuit means, third circuit means for producing a PARCOR coefficient interpolation value ($\Delta ki$) per one PARCOR coefficient interpolation from said PARCOR coefficient interpolation period ($\Delta t$) and PARCOR coefficients of two adjacent frames in synchronism with said PARCOR interpolation timing signal ($C_1$), fourth circuit means for executing a PARCOR coefficient interpolation in order by using said PARCOR coefficient interpolation value ($\Delta ki$) in synchronism with said interpolation timing signal ($C_1$) from said second circuit means, fifth circuit means for determining an amplitude interpolation period in synchronism with pitch period and for generating an amplitude interpolation timing signal ($C_2$), sixth circuit means for producing an amplitude interpolation value ($\Delta AMP$) per one amplitude interpolation from said amplitude interpolation period and amplitudes of two adjacent frames in response to said amplitude interpolation timing signal ($C_2$) from said fifth circuit means, seventh circuit means for executing an amplitude interpolation in synchronism with said amplitude interpolation timing signal ($C_2$), digital filter means for receiving interpolated speech data including PARCOR coefficient and amplitude, and acoustic means for generating a speech sound in response to an output of said digital filter means.

2. A speech synthesizer as claimed in claim 1, wherein said first circuit means comprises a first arithmetic operation circuit for executing multiplication of pitch period by repeat times by a shifting action of pitch data, and said second circuit means comprises a second arithmetic operation circuit for executing PARCOR coefficient interpolation period $\Delta t$ defined as a time period equal to said frame interval divided by $2^m$ which is the classification signal of said PARCOR coefficient interpolation period where m is an integer.

3. A speech synthesizer as claimed in claim 2, wherein said second arithmetic operation circuit executes PARCOR coefficient interpolation where the number of PARCOR coefficient interpolation is ($2^2-1$) when said frame interval is 10 msec and below, ($2^3-1$) when said frame interval is from 10 msec up to 20 msec, ($2^4-1$) when said frame interval is from 20 msec up to 40 msec, and ($2^5-1$) when said frame interval is over 40 msec.

4. A speech synthesizer as claimed in claim 3, wherein said PARCOR coefficient interpolation period is below 2.5 msec.

* * * * *